United States Patent [19]
Harada et al.

[11] Patent Number: 5,651,341
[45] Date of Patent: Jul. 29, 1997

[54] CONTROL SYSTEM FOR DYNAMICALLY OPERATIVE APPARATUSES

[75] Inventors: Yasuhiro Harada, Aki-gun; Masaaki Nakashima, Saeki-gun; Hiroyuki Arakawa, Hiroshima, all of Japan

[73] Assignee: Mazda Motor Corporation, Hiroshima, Japan

[21] Appl. No.: 562,567

[22] Filed: Nov. 24, 1995

[30] Foreign Application Priority Data

Feb. 8, 1995 [JP] Japan ................... 7-043544

[51] Int. Cl.⁶ ............... F02D 41/16; F02D 45/00
[52] U.S. Cl. ............ 123/339.2; 123/352; 123/436
[58] Field of Search .................. 123/339.2, 339.21, 123/352, 399, 478, 480, 436; 180/179; 318/561; 364/431.05

[56] References Cited

U.S. PATENT DOCUMENTS

| | | | |
|---|---|---|---|
| 3,886,915 | 6/1975 | Taplin | 123/352 X |
| 4,840,245 | 6/1989 | Kamei et al. | 123/352 X |
| 5,010,866 | 4/1991 | Ohata | 123/352 |
| 5,249,558 | 10/1993 | Imamura | 123/339.2 |
| 5,269,271 | 12/1993 | Kawai et al. | 123/339.2 X |

*Primary Examiner*—Tony M. Argenbright
*Attorney, Agent, or Firm*—Sixbey, Friedman, Leedom & Ferguson, P.C.; Gerald J. Ferguson, Jr.; Donald R. Studebaker

[57] ABSTRACT

A control system for controlling a dynamically operative apparatus having a dynamic characteristic by which a relationship between input to and output from said dynamically operative apparatus is defined includes an apparatus control subsystem and a model control subsystem for controlling an apparatus model which has an imitate dynamic characteristic modeled on the input and output relationship, performing adaptation of the imitate dynamic characteristic by optimizing control parameters of the model so that the model provides output in conformity with the input and output relationship, simulating operation of the apparatus by controlling the model after the adaptation, and regulating control parameters of the apparatus control subsystem according to a result of the simulation.

17 Claims, 13 Drawing Sheets

CONTROL SYSTEM FOR DYNAMICALLY OPERATIVE APPARATUSES

BACKGROUND OF THE INVENTION

1. Field of the Invention

The present invention relates to a control system for controlling a dynamically operative apparatus.

2. Description of Related Art

In order to assess the reliability of operation of an apparatus without actually operating the apparatus, there has been known techniques which make use of a hard model of the apparatus and a control model for operating the hard model in the same control logic as that for the apparatus. Such a technique is known from, for instance, Japanese Unexamined Patent Publication No. 4-159439.

In the recent years, in addition to a control system for actually controlling operation of an apparatus, a simulation system cooperating with a hard model of the apparatus is used to reflect the result of simulation on control of the operation of the apparatus.

While such a system enables the apparatus to be well controlled, because the apparatus has a difference in dynamic characteristics from another and causes changes in operation with age, it does not always operate with the same dynamic characteristics. For this reason, even though the result of simulation can be reflected on the control of the apparatus, because of a difference of dynamic characteristics between the apparatus and its model, the apparatus is not always controlled as desired.

SUMMARY OF THE INVENTION

It is an object of the present invention to provide a control system for controlling a dynamically operative apparatus in which an imitate dynamic characteristic of a model is always adjusted so as to be in conformity with a dynamic characteristic of the dynamically operative apparatus, controlling the dynamically operative apparatus always as desired.

It is another object of the present invention to provide a control system for controlling a dynamically operative apparatus which eliminates that the dynamically operative apparatus is confronted by extraordinary operation.

These objects of the present invention are achieved by providing a control system for controlling a dynamically operative apparatus such as an automobile engine, which has a dynamic characteristic by which a relationship between input to and output from said dynamically operative apparatus, in a specific control logic, including an apparatus control subsystem and a model control subsystem for controlling an apparatus model having an imitate dynamic characteristic modeled on the input and output relationship of the dynamically operative apparatus. The model control subsystem operates the apparatus model in the same specific control logic while the apparatus control subsystem controls operation of the dynamically operative apparatus. The model control subsystem further performs adaptation of the imitate dynamic characteristic by optimizing control parameters of the apparatus model so that the simulation apparatus model provides output in conformity with the input and output relationship and simulates operation of the dynamically operative apparatus by controlling the apparatus model after the adaptation of imitate dynamic characteristic in the specific control logic. Based on a result of the simulation, control parameters of the apparatus control subsystem are regulated.

Adaptation of the imitate dynamic characteristic eliminates influences of changes in dynamic characteristic on operation of the dynamically operative apparatus and reflects a result of simulation on the control of the dynamically operative apparatus, resulting in controlling the dynamically operative apparatus always as desired.

Simulation of the operation of the dynamically operative apparatus is made by controlling the apparatus model with different control parameters of the model control subsystem so as to determine an optimum control parameter with which control parameters of the apparatus control subsystem is replaced. The apparatus model may perform control in different control logic and determines an optimum control logic with which a control logic of said apparatus control subsystem is replaced and optimized so as to control the dynamically operative apparatus always as desired.

The control system is advantageous, in particular, to control the idle speed of an automobile engine as the dynamically operative apparatus so as to follow a target idle speed.

According to another aspect of the invention, the control system controls the apparatus model when the dynamically operative apparatus produces an extraordinary change in output responding to specific input and performs adaptation of the imitate dynamic characteristic by optimizing control parameters of the apparatus model so that the apparatus model produces the same change in output as the extraordinary change responding to the same specific input thereto. Based on simulation conducted by controlling the apparatus model after the adaptation of the imitate dynamic characteristic, a corrective value necessary to eliminate the extraordinary change is determined and substituted for a control parameter of the apparatus control subsystem.

Controlling the dynamically operative apparatus with a control parameter thus simulated and regulated with the corrective value prevents dynamically operative apparatus from causing an extraordinary change in output and enables it to operate always as desired.

The model control subsystem my perform the adaptation with a physical value related directly to an extraordinary change. If an automotive engine is controlled as the dynamically operative apparatus, the physical value with which the model control subsystem performs the adaptation may be a change in torque or otherwise in engine idle speed and the model control subsystem may simulate operation of the automotive vehicle so as to eliminate an extraordinary change in action of the automotive vehicle other than the change in torque or engine idle speed.

Further, the apparatus model may have an imitate dynamic characteristic modeled on an engine driven instrument having as an external load a strong influence on engine idle speed. In this instance, the model control subsystem performs the adaptation of the imitate dynamic characteristic of the engine driven instrument so that the apparatus model causes an extraordinary change due to driving friction of the engine driven instrument.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

The control system of the invention will be described in detail with particular reference to preferred embodiments thereof which controls an idle speed control (ISC) valve of an intake system which is used to control a rotational speed of an engine during idling. Because intake systems are well known in the art, the present description will be directed in particular to elements forming parts of, or cooperating directly with, the control system in accordance with the present invention. It is to be understood that parts or elements which are not of direct importance to the invention and parts or elements which are purely of conventional construction will not be specifically shown or described in detail since their construction and operation can easily be arrived at by those skilled in the art.

Figure 1:
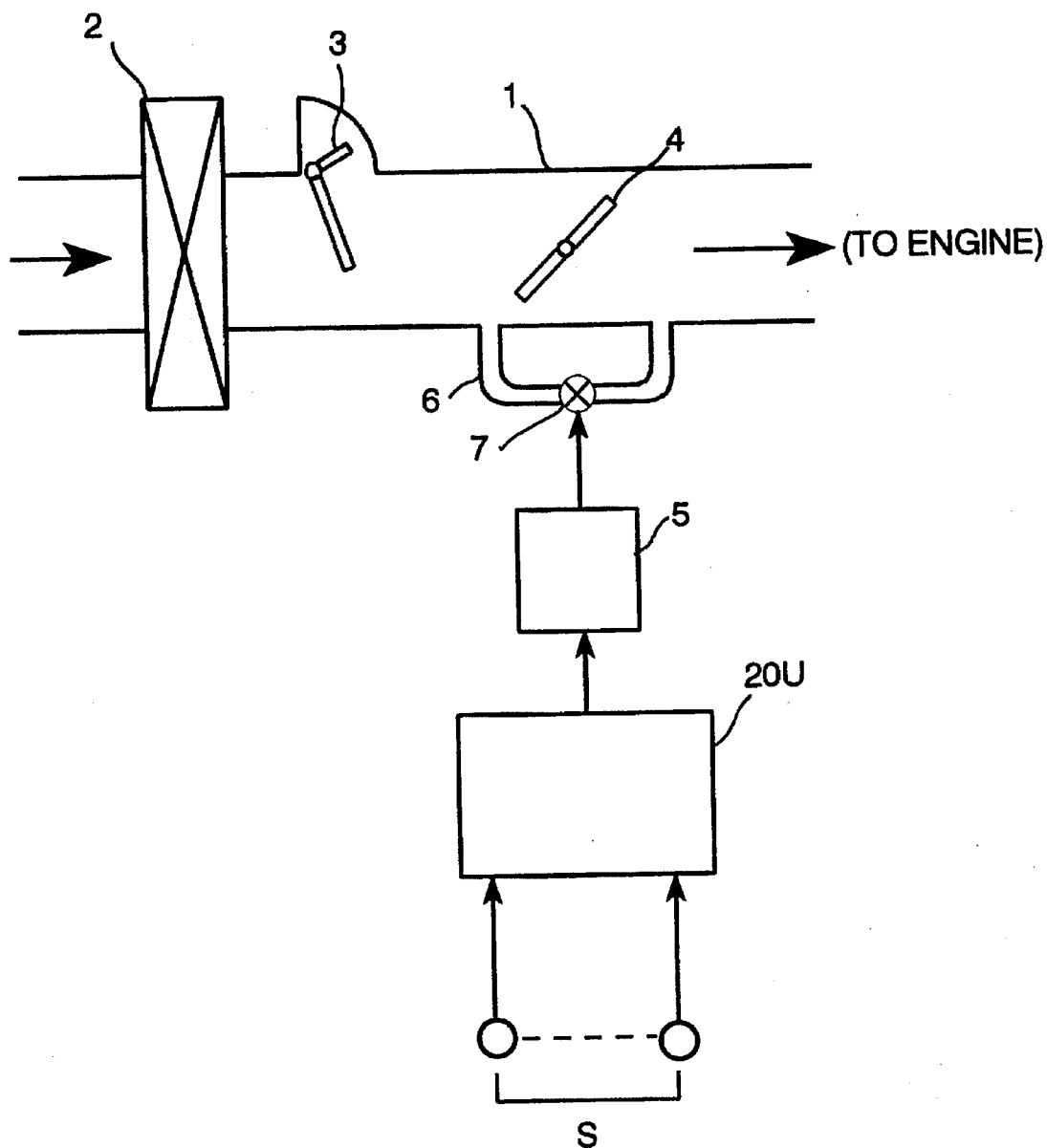
FIG. 1 is a schematic illustration of a part of an engine system as an apparatus controlled by a control system in accordance with a preferred embodiment of the present invention.

Referring to the drawings in detail, in particular to FIG. 1 schematically showing an intake system for an automobile engine 21A as a practical operative apparatus controlled by a control system in accordance with a preferred embodiment of the present invention, air is introduced into an internal combustion engine 21A schematically shown through an intake pipe 1. The intake pipe 1 is provided, in order from the upstream end toward the downstream end, with an air cleaner 2, an air flow meter 3 and a throttle valve 4. All these functional elements 2–4 are well known in various types in the art and take any known type. The intake pipe 1 is formed with a bypass passage 6 so as to allow air to flow bypassing the throttle valve 4. The amount of intake air flowing through the bypass passage 6 can be regulated by an air-flow control valve, namely an idle speed control valve 7, which is disposed in the bypass passage 6 and controlled by an electromagnetic actuator 5 to change linearly opening thereof. Variations of the amount of intake air introduced into the engine 21A change the rotational speed during idling of the engine 21A (which is hereafter referred to as the engine idle speed). Specifically, if the engine 21A is idling at a speed less than a predetermined rotational speed with the throttle valve 4 fully closed, the idle speed control (ISC) valve 7 is controlled to change its opening so as to increase the amount of intake air introduced into the engine 21A until the engine idle speed reaches a target idle speed NT of, for instance, 700 rpm. In order to regulate the engine idle speed, a control system unit 20U mainly comprised of a microcomputer will be described in detail latter, controls operation of the electromagnetic actuator 5 so as to change the opening of the idle speed control (ISC) valve 7. The electromagnetic actuator 5 is operated with a signal representative of a duty ratio. The control system unit 20U determines the duty ratio based on various control signals input thereinto through various sensors and switches, generally indicated by a reference S, which include at least a throttle opening sensor, an engine speed sensor and sensors or switches for detecting operations of accessory equipments driven by the engine 21A. The engine assisted accessory equipments refer to external loads, such as an air-conditioning system and a power steering system, which have dynamic influences on operation of the engine 21A.

Figure 2:
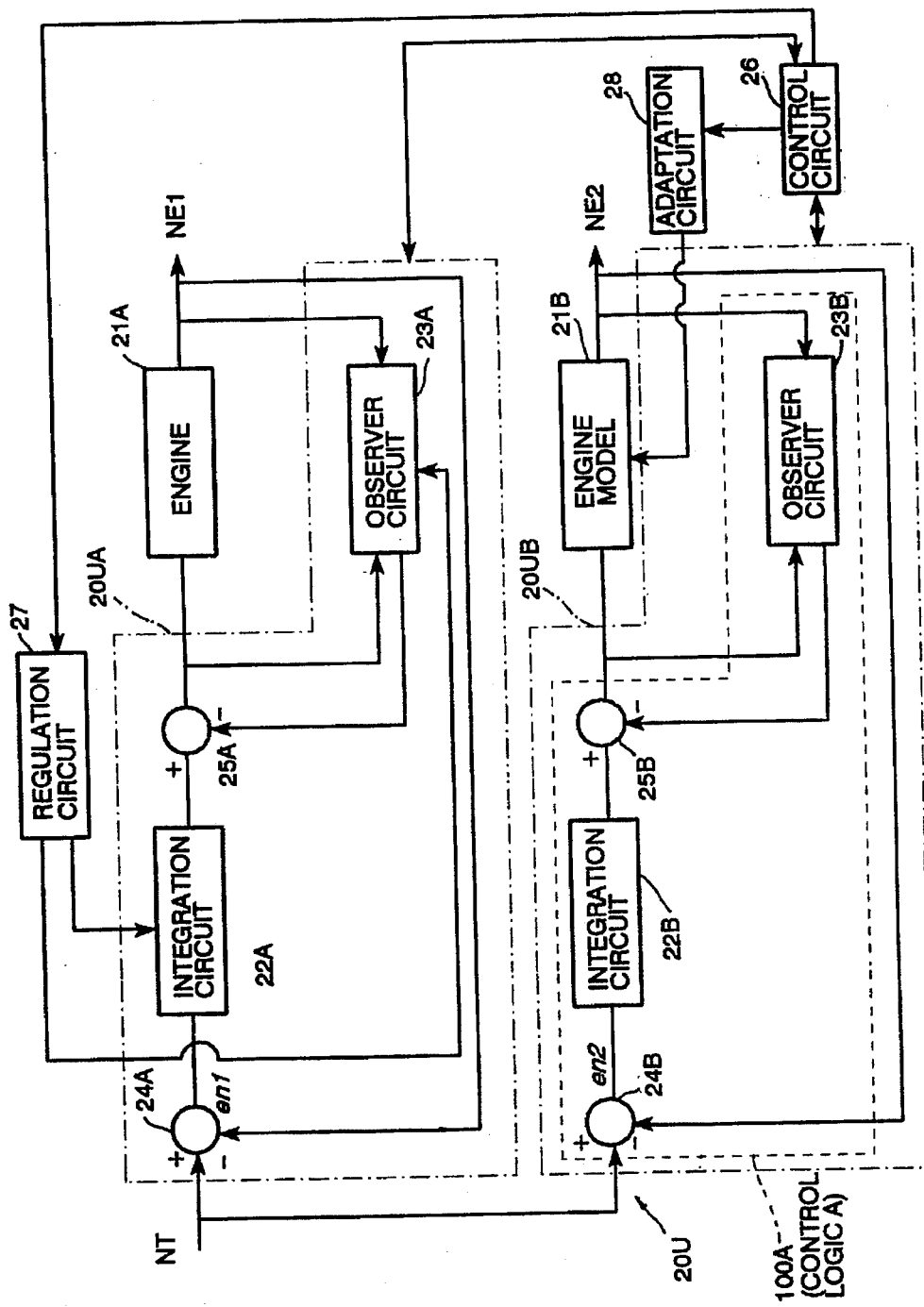
FIG. 2 is a block diagram of the control system.

Referring to FIG. 2 showing the control system unit 20U in block diagram, the control system unit 20U comprises two control subsystems, namely a practical control subsystem 20UA for controlling the engine 21A as a practical operative apparatus and a model control subsystem 20UB for controlling a model 21B modeled on a dynamic characteristic of the practical operative apparatus, i.e. the engine 21A, (which is refereed to as an engine model) so as to simulate input and output of the practical operative apparatus and optimize control parameters and a control logic for the practical control system 20UA. The engine model 21B is designed and adapted so as to have the same direct physical relationship between input and output as the practical engine 21A. If the engine model 21B has dynamic characteristics perfectly identical with those of the practical engine 21A, it provides output in conformity with the input-output relationship of the practical engine 21A.

The practical control subsystem 20UA includes an integration circuit 22A for governing feedback control and an observer circuit 23A for governing current control. The integration circuit 22A integrates a deviation en1 of an engine idle speed NE1 from the target idle speed NT which is calculated by a first subtraction circuit 24A. The observer circuit 23A calculates an engine control parameter on the basis of the engine idle speed NE1 and a duty ratio DFB of the electromagnetic actuator 5 at which the idle speed control (ISC) valve 7 is controlled. A deviation between the integrated value from the integration circuit 22A and the control parameter obtained by the observer circuit 23A is calculated by a second subtraction circuit 25A and is applied as an input to the observer circuit 23A. Similarly, the model control subsystem 20UB is organized by a control circuit 100A so as to perform control in the same control logic A as the practical control subsystem 20UA and includes an integration circuit 22B and an observer circuit 23B. The integration circuit 22B integrates a deviation en2 of an input, i.e. an engine model idle speed NE2, from the target idle speed NT which is calculated by a first subtraction circuit 24B. The observer circuit 23B calculates an engine model control parameter on the basis of the engine model idle speed NE2 and a duty ratio of the electromagnetic actuator 5. A deviation between the integrated value from the integration circuit 22B and the control parameter obtained by the observer circuit 23B is calculated by a second subtraction circuit 25B and is applied as an input to the observer circuit 23B. The model control subsystem 20UB provides as an output an simulated engine idle speed NE2 with the input, i.e. the target idle speed NT. As will be described in detail later, a control circuit 26 controls these subsystems 20UA and 20UB to make adaptation of dynamic characteristics of the engine model 21B, optimize control parameters and a control logic for the practical control subsystem 20UA, and prevent extraordinary output of the engine 21A such as a significant drop in engine idle speed. In order to perform these control, the control system unit 20U includes a regulation circuit 27 for regulating the control parameters for the practical control subsystem 20UA according to the result of simulation and an adaptation circuit 28 for the adaptation of the dynamic characteristics of the engine model 21B, both circuits 27 and 28 cooperating with the control circuit 26.

Figure 3:
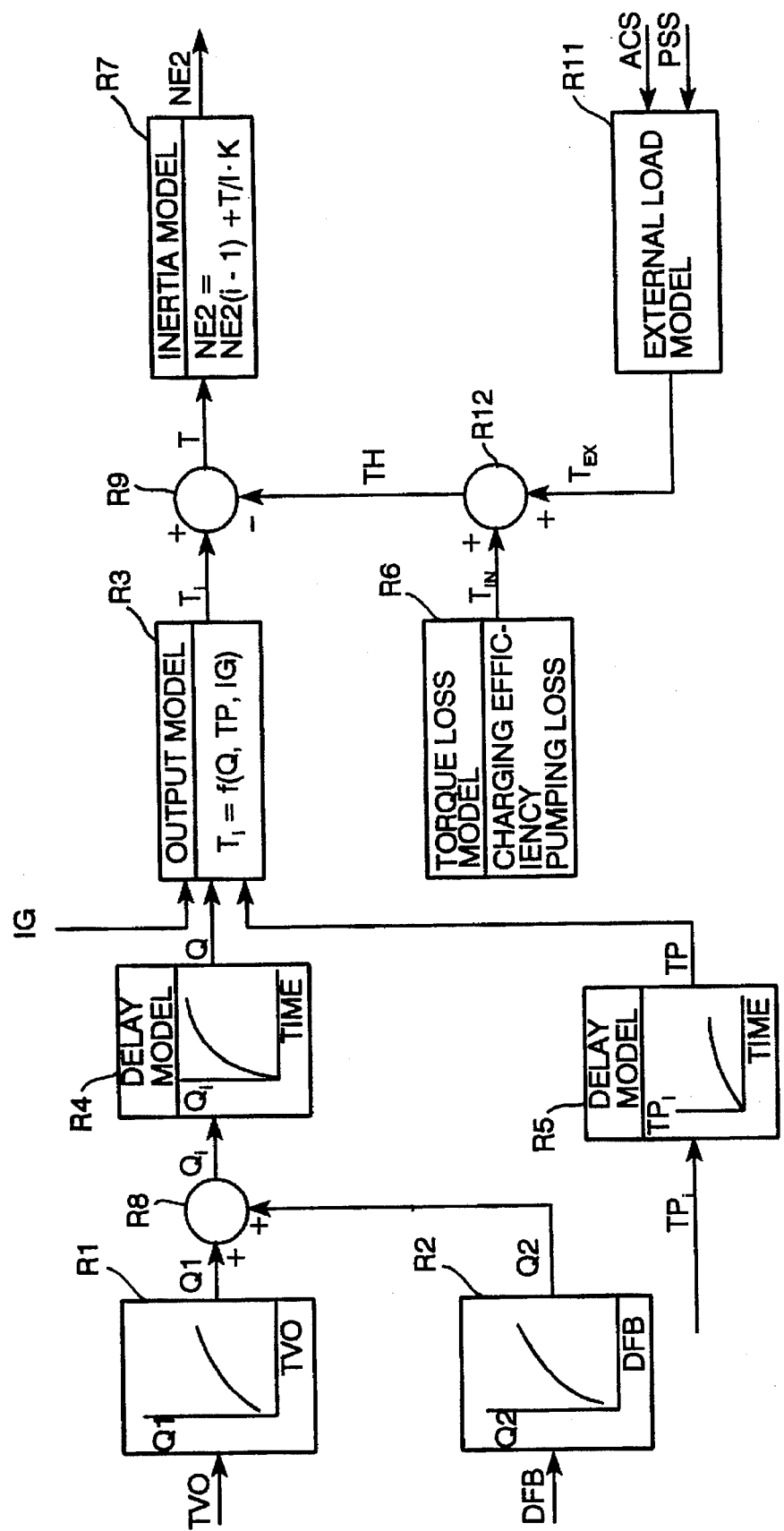
FIG. 3 is a block diagram of a model of the engine.

Referring to FIG. 3, the engine model 21B comprises various model circuits including an engine torque model circuit R3 for simulating engine output torque $T_{(i)}$ with the charged amount of air Q, a fuel injection pulse TP and an ignition pulse IG as parameters. In order to give the charged amount of air Q, model circuits R1, R2, R4 and R5 are provided. The intake air map circuit R1 deducts the amount of intake air Q1 depending upon opening TVO of the throttle valve 4. The bypass air map circuit R2 deduces the amount of bypass air Q2 depending upon a duty rate DFB at which the idle speed control valve 7 is operated. These amounts of air Q1 and Q2 are added together by an adder circuit R8. The delay adjustment model circuit R4 makes corrective delay adjustment of the resultant amount of air $Q_{(i)}$, i.e. Q1+Q2, so as to provide the eventual charged amount of air Q. Letting the correction coefficient and the previous resultant amount of air be R4 (which is variable between 0 and 1) and $Q_{(i-1)}$, the eventual charged amount of air Q is given by the following equation:

$$Q = R4 \cdot Q_{(i)} + (1-R4) \cdot Q_{(i-1)}$$

The delay adjustment model circuit R5 makes corrective delay adjustment of a fuel ignition pulse $TP_{(i)}$. Letting the correction coefficient be R5 (which is variable between 0 and 1), the eventual fuel injection pulse TP is given by the following equation:

$$TP = R5 \cdot TP_{(i)} + (1-R5) \cdot TP_{(i-1)}$$

The engine torque model circuit R3 provides engine output torque $T_{(i)}$ given as a function of the eventual charged amount of air Q, the injected amount of fuel TP and an ignition pulse IG.

Eventual engine output torque T is determined with consideration of a torque loss TH including an internal torque loss $T_{IN}$ and a torque loss $T_{EX}$ caused by external loads of engine assisted equipments or devices, such as an air conditioning system ACE and a power steering system PSS. The internal torque loss $T_{IN}$ of the practical engine 21A is simulated based on an air charging efficiency and a pumping loss characteristic with a torque loss model circuit R6. The torque loss $T_{EX}$ of the practical engine 21A is simulated by an external load model circuit R11 which will be described in detail later. These torque losses $_{IN}$ and $T_{EX}$ are added together by an adder circuit R12 as an eventual torque loss TH. An eventual engine output torque T is determined as a deviation between the engine output torque $T_{(i)}$ and the eventual torque loss TH by a substraction circuit R9. In order to simulate an engine idle speed, the engine model 21B further includes an inertia model circuit R7 for calculating an engine idle speed NE2 given by the following equation:

$$NE2 = NE2_{(i-1)} + (T/I) \cdot K$$

where I and K are invariables.

Figure 4:
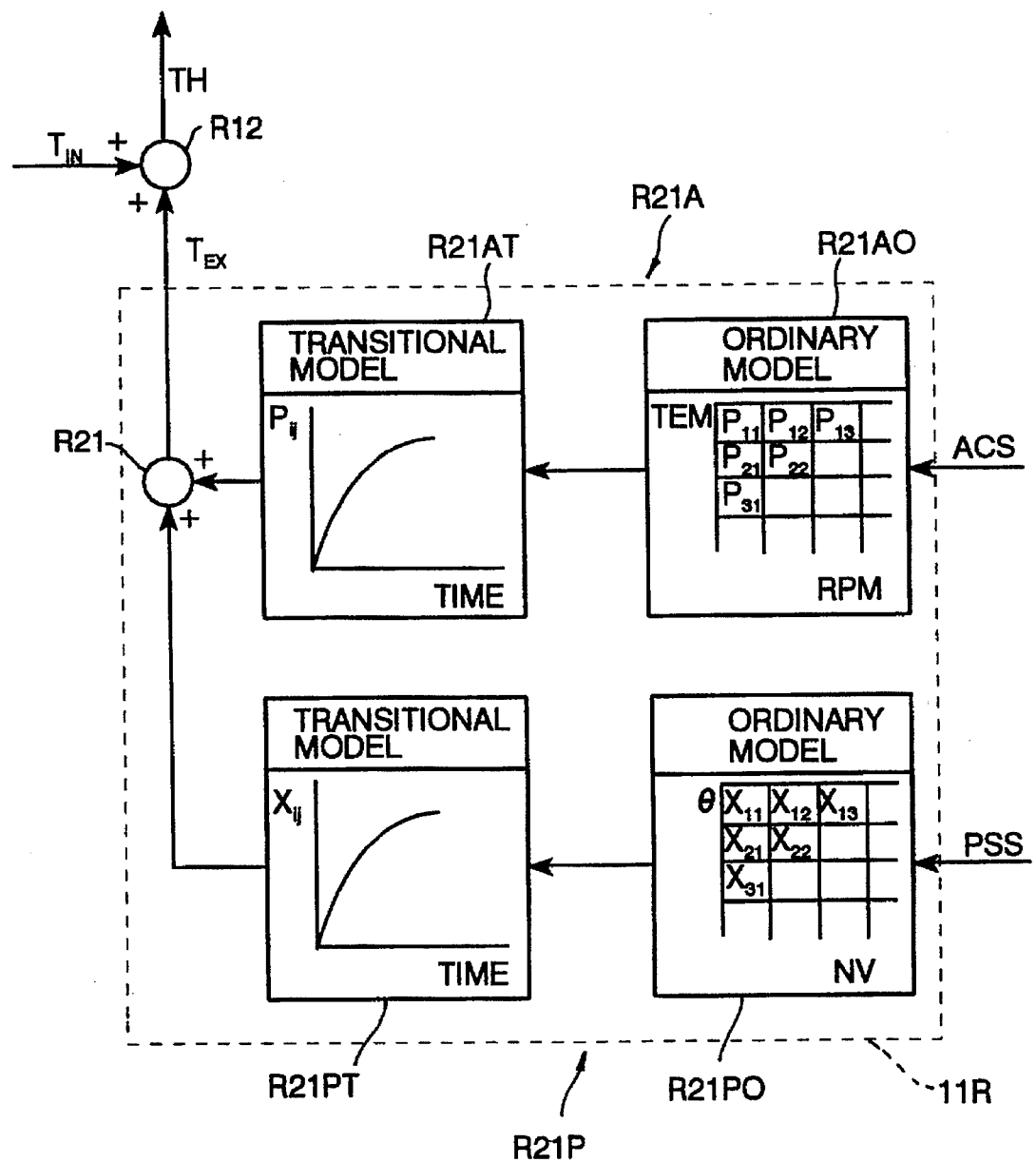
FIG. 4 is a block diagram of a model of apparatuses as external loads driven by the engine.

Referring to FIG. 4 showing the external load model circuit R11 in detail, two operation circuits R21A and R21P are provided for calculating engine losses caused by, for instance, an air conditioning system ACS and a power steering system PSS, respectively. Each operation circuit R21A, R21P has two model circuits, namely an ordinary model circuit R21AO, R21SO and a transitional model circuit R21AT, R21PT. The ordinary model circuit R21AO, which has a map of parameters Pij (i=1, 2, 3, . . . ; J=1, 2, 3, . . . . ) defined by engine speed (NE) and external temperature (TMP) resulting from operation of the air conditioning system ACS, simulates an equivalent torque loss as parameters. The transitional model circuit R21AT performs corrective delay adjustment of the equivalent torque loss Pij in the manner similar to that applied to the charged amount of air Q and the fuel injection pulse TP. Similarly, the ordinary model circuit R21PO, which having a map of equivalent torque loss Xij resulting from operation of the power steering system PSS, simulates an equivalent torque loss Xij (i=1, 2, 3, . . . ; J=1, 2, 3, . . . . ) defined by steering angle (θ) and vehicle speed (NV) as parameters. The transitional model circuit R21PT performs corrective delay adjustment by optimizing parameters Xij in the manner similar to that applied to the charged amount of air Q and the fuel injection pulse TP. These parameters Pij and Xij are added together as an equivalent torque loss $T_{EX}$ by an adder circuit R21.

Figure 5:
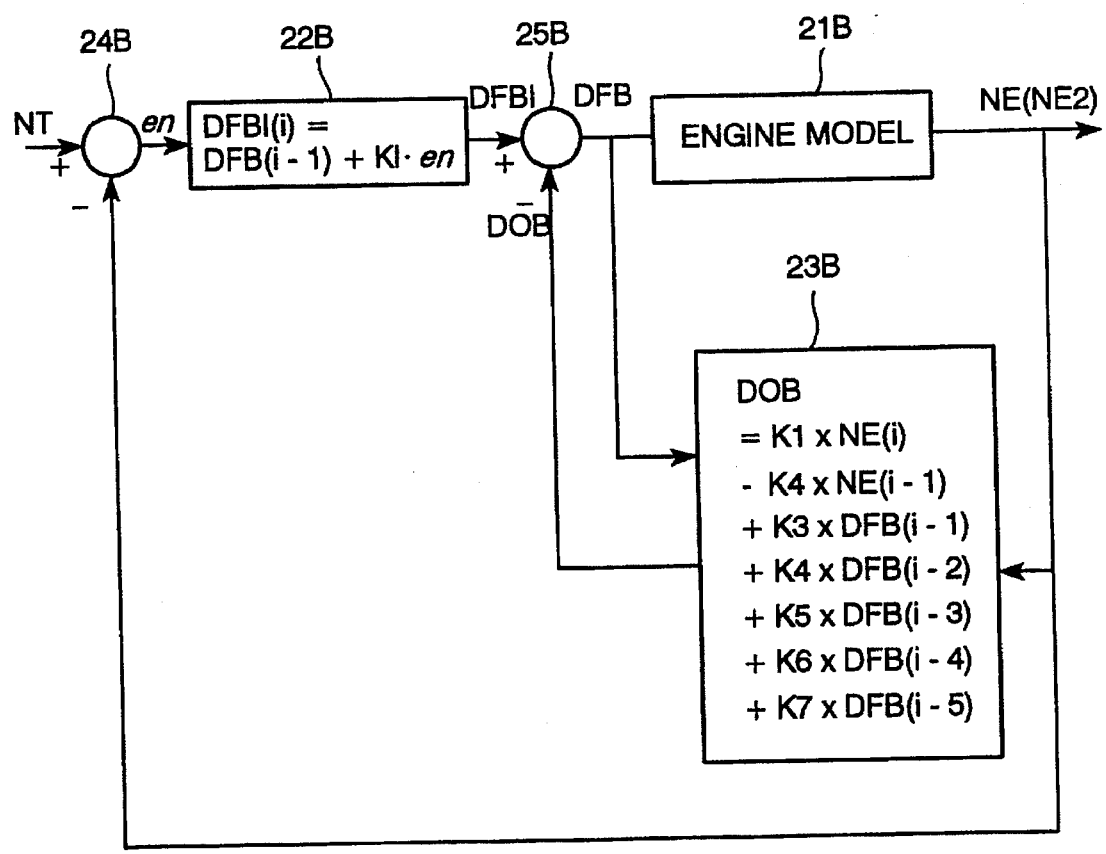
FIG. 5 is a block diagram of a control subsystem for controlling the model.

Referring to FIG. 5 in which the integration circuit 22B and the observer circuit 23B Of the model control subsystem 20UB is shown in detail, the integration circuit 22B calculates an assessed duty rate DFBI at which the idle speed control (ISC) valve is operated. The assessed duty rate DFBI is given by the following equation:

$$DFBI_{(i)} = DFB_{(i-1)} + KI \cdot en$$

where $DFBI_{(i)}$ is the current assessed duty rate;
$DFB_{(i-1)}$ is the previous eventual duty rate;
KI is an integration constant; and
en is the speed deviation between actual and target engine idle speeds NE and NT.

The duty rate DFB is given as a deviation between the current assessed duty rate DBFI and a corrective duty rate DOB. As shown in FIG. 5, the corrective duty rate DOB is given by the following equations:

$$DOB = K1 \cdot NE(i) - K2 \cdot NE(i-1) + K3 \cdot NE(i-1) + K4 \cdot NE(i-2) + K5 \cdot NE(i-3) + K6 \cdot NE(i-4) + K7 \cdot NE(i-5)$$

where NE is the output of the engine model 21B, i.e. the simulated engine idle speed NE2; and
K1–K7 are control constants.

That is, the corrective duty rate DOB is determined based on seven parameters, namely the latest two simulated engine idle speeds and the latest five eventual duty rates DFB.

The deviation between the current assessed duty rate DBFI and a corrective duty rate DOB, namely the eventual duty rate DFB, is calculated by a substraction circuit R25B and applied as an input to the engine model 21B and the observer circuit 23B. The integration circuit 22A and the observer circuit 23A of the practical control subsystem 20UA has the same construction and operation as the model control subsystem 20UB and, however, operates to calculate a practical eventual duty rate DFB with respect to a practical engine idle speed NE1.

The operation of the control system unit 20U depicted in FIG. 2 will be best understood by reviewing FIGS. 6–9, which are flow charts illustrating a main routine and subroutines for the microcomputer of the control system unit 20U. The following description is written to enable a programmer having ordinary skill in the art to prepare an appropriate program for the microcomputer. The particular details of any such program would of course depend upon the architecture of the particular computer selected. The following description will be directed to an instance where the vehicle is stopping.

FIG. 4 is a flow chart of the main routine or general control routine for the microcomputer of the control system unit 20U which performs the adaptation of the dynamic characteristics of the engine model 21B, optimizing control parameters of the practical control subsystem 20UA through simulation with the engine model 21B, and corrective control of extraordinary output of the engine 21A which results in extraordinary significant drops in engine idle speed. Such an extraordinary significant drop in idle speed is caused due to an abruptly increasing loss in engine torque during continuous operation of the external load. After a short period of time from the start of the external load, the engine gradually recovers torque lost due to the external load and becomes to provide steady torque. Following the recovery of torque, the engine increases its idle speed and operates at a steady idle speed.

Main Routine

When the microcomputer is powered on, the first decision at step S1 is: "has an engine assisted accessory equipment, such as the air conditioning system or the power steering system, just been started (as evidenced by, for instance, an input pulse generated upon coupling a clutch of an air compressor of the air conditioning system)?" If the answer to the decision is "NO," another decision is made at step S2 as to whether the external load remains operated. If the answer to the second decision is "NO," this indicates than the external load operates continuously and renders the engine unsteady in dynamic operation, then, the main control routine returns without conducting the adaptation of the dynamic characteristics of the engine model 21B. On the other hand, if the answer to the second decision is "YES," this indicates that the engine is under steady dynamic operation, then, adaptation is conducted for the dynamic characteristics of the engine model 21B. That is, the adaptation subroutine is called for at step S3, Dynamic Characteristics Adaptation Subroutine Referring to FIG. 7, which is a flow chart of the adaptation subroutine, a decision is made at step S301 as to whether there are changes in engine input greater than specified values. Such changes include a change in the amount of intake air which is represented or evidenced by a change in throttle opening TV0 and a change in duty rate DFB, and a change in target idle steed NT due to a raise in engine temperature, external loads, etc. If the answer is "YES," this indicates that all of these throttle opening, duty rate and target idle speed demonstrate changes greater than the specified values, respectively, and the engine considered to be is under unsteady operation, then, the step S301 orders return to the main routine, after the step in the main routine calling for the adaptation subroutine.

If the answer to the decision is "NO," another decision is subsequently made at step S302 as to whether a rating Hi in consistency of dynamic characteristics between the practical engine 21A and the engine model 21B under an ordinary or steady state of operations is less than a specified value $H_r$. Dynamic characteristics consistency rating Hi is a measurement of how precise the dynamic characteristics are consistent with each other between the practical engine 21A and the engine model 21B—the "smaller" the dynamic characteristics consistency rating Hi, the "higher" the degree of consistency between the dynamic characteristics of the practical engine 21A and the engine model 21B. If the dynamic characteristics consistency rating Hi is not less than the specific value, this indicates that the dynamic characteristics are inconsistent with each other between the practical engine 21A and the engine model 21B as greatly as unacceptable, a further decision is subsequently made based on engine operation conditions at step S303 as to whether the adaptation of the dynamic characteristics of the engine model 21B must be performed. That is, When the practical engine 21A is still under the ordinary or steady state of dynamic operation which is evidenced by a change each in idle speed N1 and in duty rate DFB in connection with the practical engine 21A within specified limits, the adaptation of dynamic characteristics of the engine model 21B for ordinary engine operation is performed by optimizing control parameters, i.e. time constants $R_1$, $R_2$ and $R_3$, used in the model circuits R1, R2 and R3 through steps S303–S307. However, when the practical engine is not under steady dynamic operation, the step S303 orders return to the main routine, after the step in the main routine calling for the adaptation subroutine.

At step S304, first to n-th combinations of time constants $R_1$, $R_2$ and $R_3$ are read out from a time constant combination map. At step S305, the dynamic characteristics consistency Hi is rated based on the engine idle speeds NE1 and NE2 simulated with each combination of time constants $R_1$, $R_2$ and $R_3$. The dynamic characteristics consistency rating Hi is given by the following equation:

$$Hi = \int_0^T |NE1 - NE2|^2 dt.$$

After having stored the dynamic characteristics consistency ratings Hi thus calculated at step S306, time constants $R_1$, $R_2$ and $R_3$ of a combination evidenced by the smallest rating H(min) among the first to n-th dynamic characteristics consistency ratings Hi are substituted for those previously used in the model circuits R1, R2 and R3 of the engine model 21B, respectively, at step S307.

If the answer to the decision concerning the dynamic characteristics consistency rating Hi is "YES," another decision is subsequently made at step S308 as to whether the practical engine 21A is in the transitional state of operation. Specifically, the transitional state of the practical engine 21A is evidenced by either a change in the engine idle speed N1 greater than a specified value or a change in the duty rate DFB greater than a specified value. If the answer to the decision is "YES," the adaptation of the dynamic characteristics of the engine model 21B for transitional engine operation is performed by optimizing control parameters, i.e. time constants $R_4$ and $R_5$, used in the model circuits R4 and R5 through steps S309–S312. The optimization procedure through steps S309–S312 is performed in the same manner as through steps 304–S307, but in connection with the time constants $R_4$ and $R_5$, and need not be explained in detail again. However, when the practical engine is not in the transitional state of operation, the step S308 orders return to the main routine, after the step in the main routine calling for the adaptation subroutine.

While it would be considered that, when the answer to the decision concerning engine operation conditions made at step S303 is "NO," the subroutine is directed to step S308 where a decision is made concerning the transitional state of operation of the practical engine 21A, nevertheless, since, in this instance, the adaptation of the dynamic characteristics of the engine model 21B is made with regard to the time constants $R_1$, $R_2$ and $R_3$ in preference to the time constants $R_4$ and $R_5$. the adaptation subroutine terminates when the practical engine 21A is not in the ordinary state of operation.

Main Routine-continued

Figure 6:
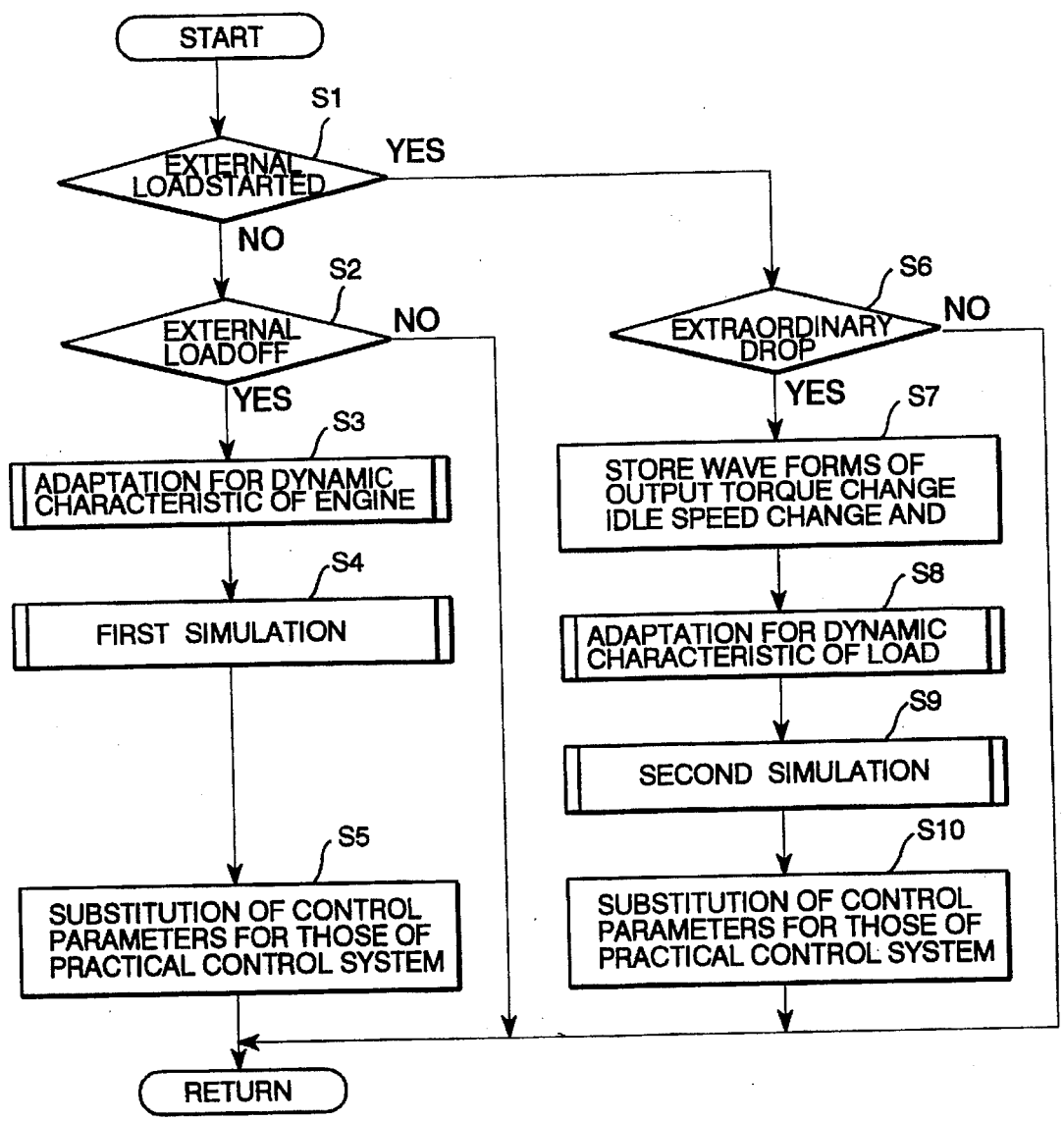
FIG. 6 is a flow chart illustrating the general sequential routine of control.
Figure 7:
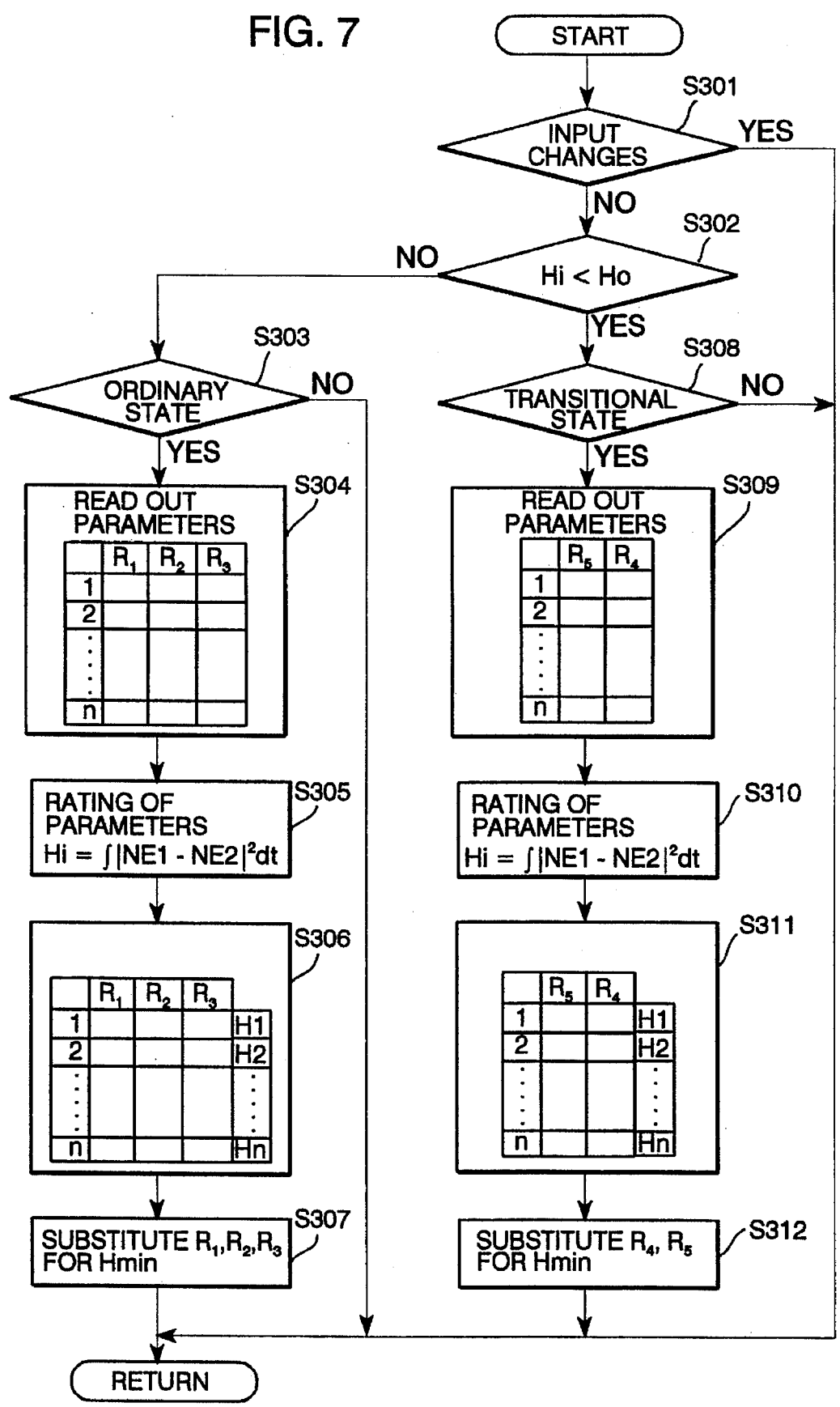
FIG. 7 is a flow chart illustrating the sequential routine of adaptation of control parameters for the engine model.

Referring back to the main routine in FIG. 6, subsequently to the conforming of the dynamic characteristics of the engine model 21B, the first simulation is conducted in connection with the dynamic characteristics of the engine model 21B. That is, the simulation subroutine is called for at step S4.

Simulation Subroutine

Figure 8:
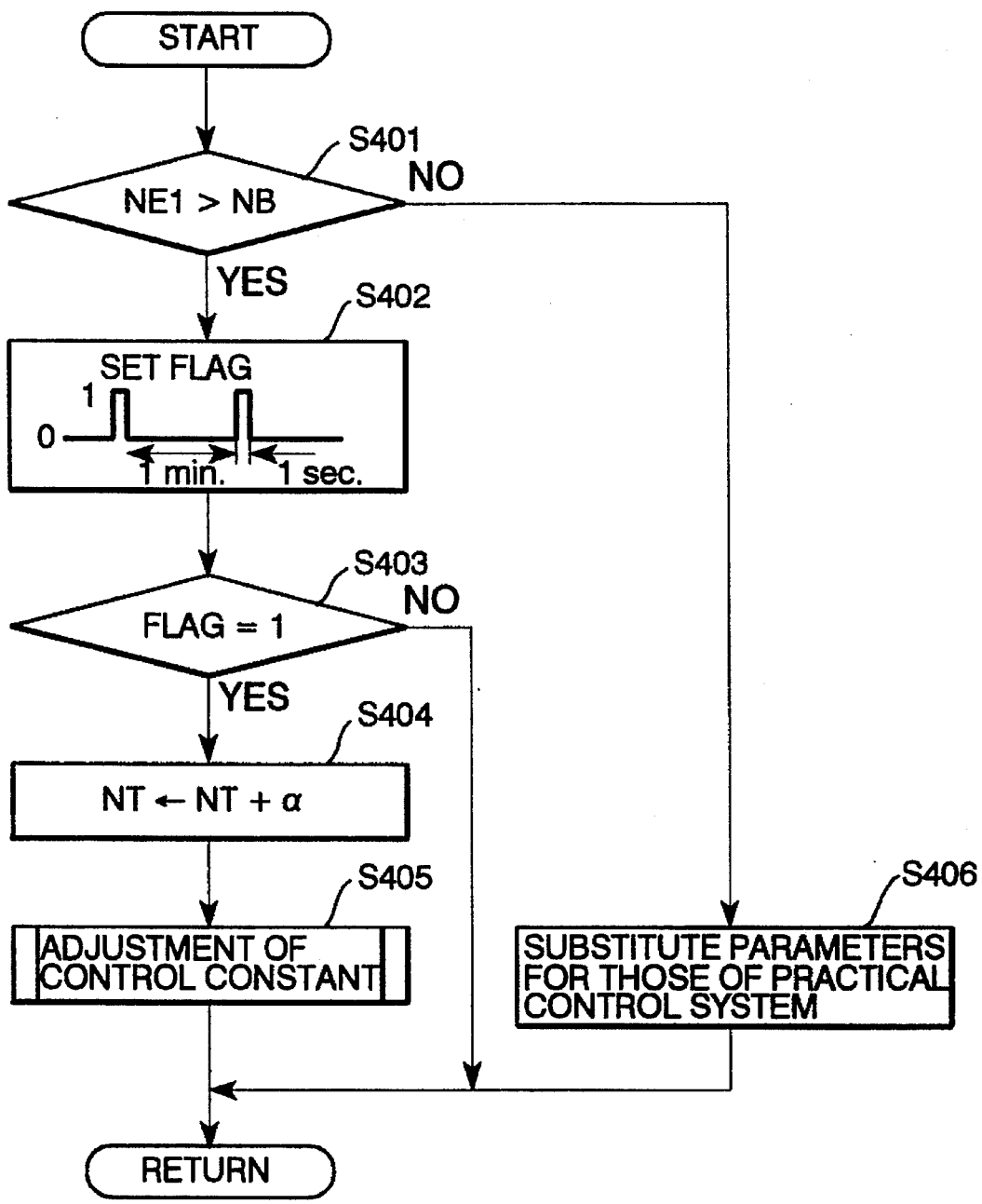
FIG. 8 is a flow chart illustrating the sequential routine of simulation of control of the engine by optimizing control parameters of the engine model.

Referring to FIG. 8, which is a flow chart of the simulation subroutine, the first step at step S401 is to make a decision as to whether the idle speed NE1 of the practical engne 21A is greater than a specified speed NB. This decision is made to confirm that there is no possibility that the practical engine 22B is brought into stalling. If the answer to the decision is "NO," control parameters KI and K1–K7 evidenced by the smallest output consistency rating He(min) at step S406. If the answer is "YES," a flag is set up for a period of time of, for instance, one second every one minute of interval at step S402. Setting up the flag is made by use of, for instance, a clock pulse. A decision is subsequently made at step S403 as to whether the flag is up. If the flag has been up, the target idle speed NT is increased by an increment of $\alpha$ in rpm which is between approximately 50 to 100 rpm at step S404. In this manner, the target idle speed NT is jumped up in a single leap and held for a specified period time. Thereafter, at step S405, a duty rate regulation subroutine shown in FIG. 9 is called for in order to optimize control parameters, such as the control constants KI and K1–K7, suitable for harmonization of the output of both practical engine 21A and engine model 21B, i.e. the engine idle speeds NE1 and NE2, with each other.

Control Parameter Regulation Subroutine

Figure 9:
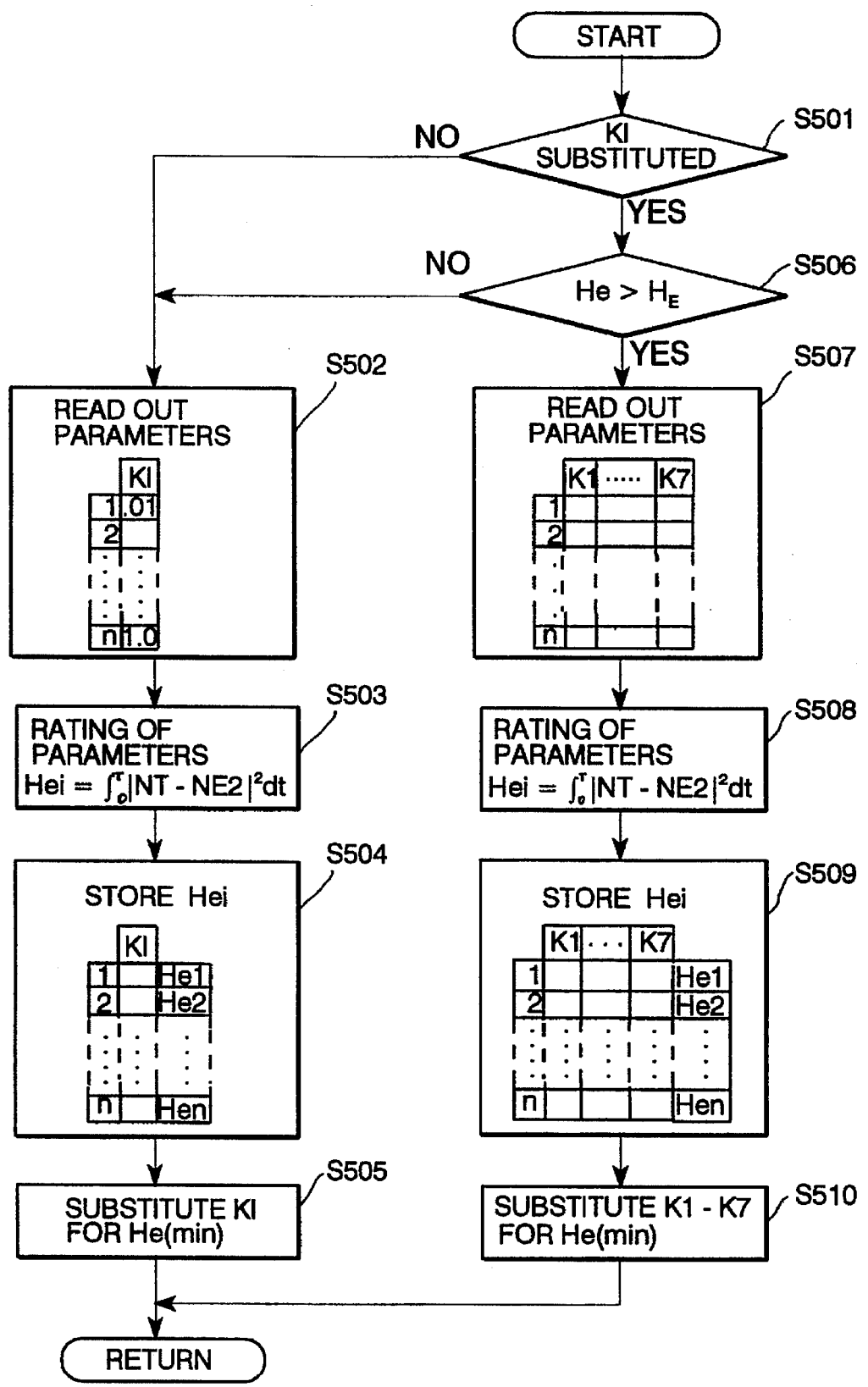
FIG. 9 is a flow chart illustrating the sequential routine of simulation of control of the engine by optimizing control parameters of the control system.

Referring to FIG. 9, which is a flow chart of the control parameter regulation subroutine, a decision is made at step S501 as to whether the integration constant KI has been optimized. At the beginning, the answer is always "NO," the regulation of duty rate for the engine model 21B is performed by optimizing the integration constant KI through steps S502–505. On the other hand, after the optimization of integration constant KI, that is, if the answer to the decision is "YES," another decision is made at step S506 as to whether a rating He in consistency of output between the practical engine 21A and the engine model 21B is greater than a specified value $H_2$. Output consistency rating He is a measurement of how precise the output are consistent with each other between the practical engine 21A and the engine model 21B—the "smaller" the output consistency rating He, the "higher" the degree of consistency between the output from the practical engine 21A and the engine model 21B. If the output consistency rating He is not greater than the specific value $H_8$, the regulation of duty rate is performed once again in connection with the integration constant KI through steps S502–505. However, if the output consistency rating He is greater than the specific value $H_8$, the optimization of control constants is performed in connection with control constants K1–K7 through steps S507–510.

After reading in first to n-th integration constants KI from a control constant map at step S502, the output consistency Hei is rated based on the target and practical engine idle speeds NT and NE2 simulated with each integration constant $KI_i$. The output consistency rating Hei is given for each integration constant $KI_i$ by the following equation:

$$Hei = \int_0^T |NT - NE2|^2 dt.$$

After having stored the output consistency ratings He at step S504, an optimum integration constant KI evidenced by the smallest output consistency rating H(min) among the first to n-th output consistency ratings He is substituted for that previously used in the integration circuit 22B of the model control subsystem 20UB at step S505.

If the answer to the decision concerning the output consistency rating He made at step S506 is "YES," the regulation of duty rate for the engine model 21B is performed by optimizing control parameters, i.e. control constants K1–K7, used in the observation circuit 23B of the model control subsystem 20UB, through steps S507–510. The optimization of control constants K1–K7 is processed in the same manner as through steps S502–S514, but in connection with the control constants K1–K7, and need not be explained in detail again.

When the duty rate is regulated at step S505 or at step S510, the final step orders return to the main routine, after the step in the main routine calling for the simulation subroutine.

Main Routine-continued

Referring back to the main routine in FIG. 6, subsequently to the simulation, the optimized control constants KI and K1–K7 are substituted for the control constants KI and K1–K7 of the practical control subsystem 20UA through the regulation circuit 27 at step 85.

Figure 10:
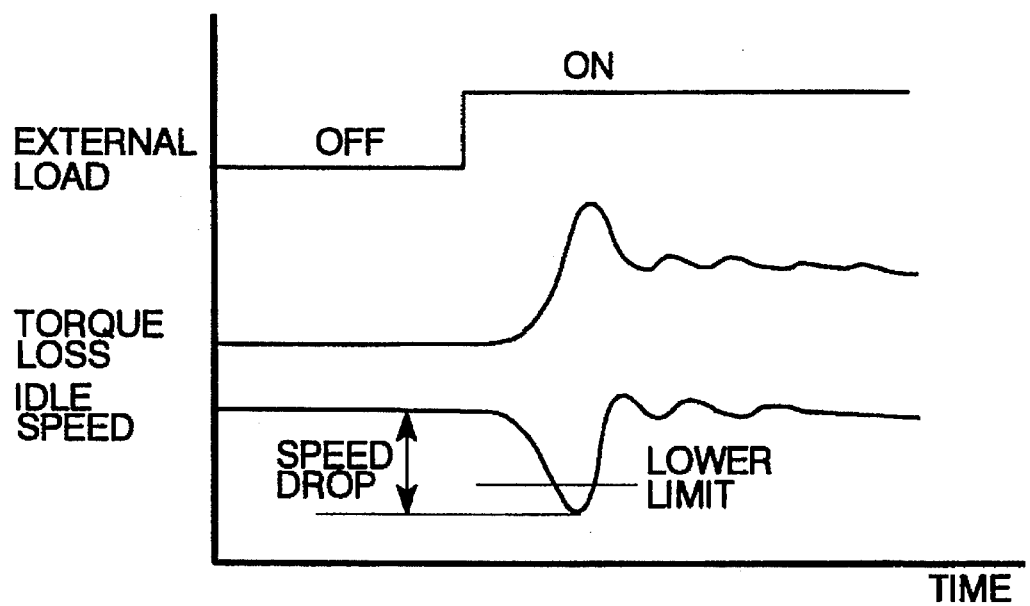
FIG. 10 is a diagram showing an extraordinary drop in engine idle speed as output of the apparatus.

If the answer to the decision concerning the start of the engine assisted accessory equipment as an external load made at step S1 is "YES," this indicates that the practical engine 21A is expected to cause a sharp drop in idle speed NE2, then, another decision is made at step S6 as to whether an extraordinary significant drop is occurring in idle speed NE2 of the practical engine 21B. As is shown in FIG. 10, when starting an engine assisted accessory equipment as external load, such as the air conditioning system and the power steering system, there occurs a sharp engine torque loss accompanying an extraordinary significant drip in idle speed. After a relatively short period of time from the start of the external load, the engine gradually recovers the torque lost due to the external load and becomes to provide steady output torque. Following the recovery of output torque, the engine increases the idle speed and becomes stable at a steady idle speed. In this instance, when a drop in the idle speed of the practical engine 21A exceeds a lower limit, or otherwise when there occurs a drop in idle speed more than 100 rpm from an idle speed just before the start of the external load, the answer is to the decision is "YES". The lower limit is set to, for example, 600 rpm for a target idle speed of 700 rpm.

If the answer to the decision made at step S6 is "YES," wave forms representative of the engine torque loss and the engine idle speed NE1 shown in FIG. 10 are stored in an random access memory (RAM) of the control system unit 20U at step S7. Subsequently, at step S7, the adaptation of the dynamic characteristics of the external loads is performed by optimizing control parameters Pij and/or Xij so that the practical engine 21A creates changes in output torque loss and engine idle speed specified by the wave forms when the practical engine 21B causes an extraordinary drop in idle speed exceeded the limit. The optimum adaptation at step S8 is performed in the same manner as for the control constants $R_1$–$R_5$, but for the control parameters Pij and/or Xij. As apparent, the optimum adaptation is necessary to be performed in connection only with an external load due to which an extraordinary drop in idle speed is caused. If the air conditioning system and the power steering system are almost simultaneously started, the optimum adaptation is performed for both control parameters Pij and Xij. Thereafter, simulation is made at step S9 with the model control subsystem 20UB including the engine model 21B and the external load model R11 so as to determine a corrective value of duty rate DBF necessary to eliminate the extraordinary drop expected to occur upon starting the external load or loads. In this instance, the corrective value gives an increase in opening of the idle speed control (ISC) valve 7 necessary to prevent an extraordinary drop in engine idle speed when the engine is applied with the same input as a specific input which has caused the engine 21A to produce the extraordinary drop in engine idle speed. Each of these control constants KI and K1–K7 has different values selectively used for the transitional state of external loads and the ordinary state. Alternatively, the control constant KI, K1–K7 may have a single value used not for the transitional state of external loads but for the ordinary state. This corrective value is stored in the random access memory (RAM) of the control system unit 20U at step S10. Subsequently to the simulation, the corrective control value is added to the duty rate DFB in the practical control subsystem 20UA upon starting the external load.

After the substitution of simulated control parameters for those in the practical control subsystem 20UA at step S5 or step S10, the main routine returns.

Figure 11:
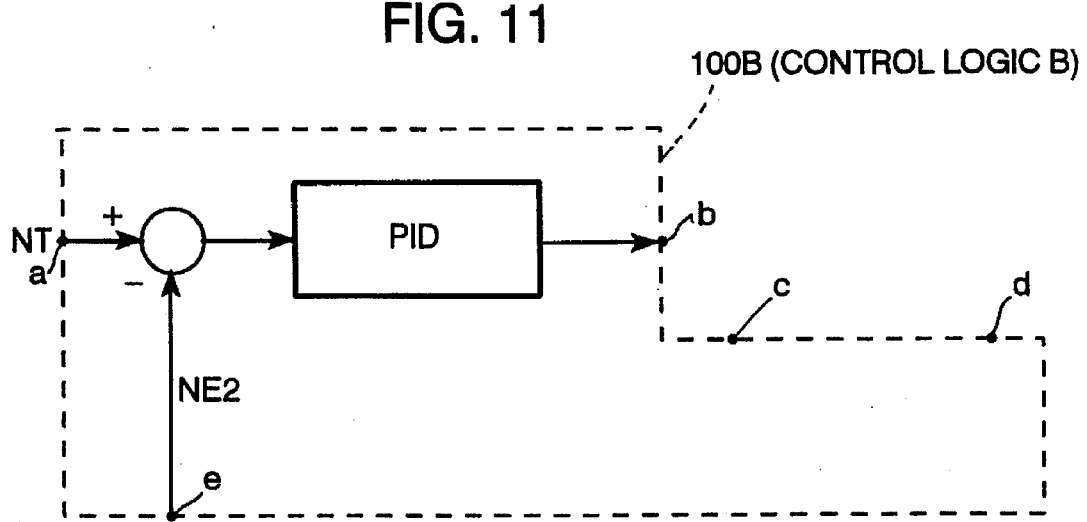
FIG. 11 is a block diagram showing a control circuit performing control of the engine in another control logic.
Figure 12:
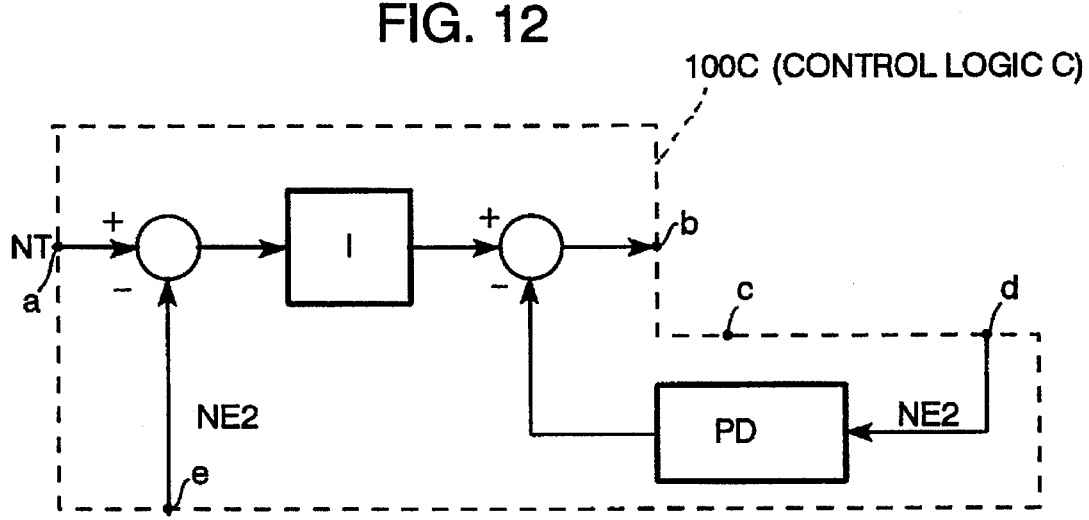
FIG. 12 is a block diagram showing a control circuit performing control of the engine in still another control logic.

The control logic in which the practical control subsystem 20UA performs the control of engine may be replaced with other control logic such as shown in FIGS. 11 and 12. In order to make the optimization of control logic for the engine, these control logic are simulated by the model control subsystem 20UB.

FIGS. 11 and 12 show control circuits 100B and 100C for causing the model control subsystem 20UB to perform control in control logic B and C, respectively. Each of these circuits 100B and 100C is connected to the engine model 21B at junctures a–e. The control logic B performs feedback control in PID control and the control circuit 100B does not include an observer circuit such as one of the simulation subsystem shown in FIG. 2, accordingly. The control logic C performs feedback control in I-PD control and the control circuit 100C, accordingly, does not include an observer circuit such as one of the model control subsystem shown in FIG. 2. The PID control is well known in the art as a simple combination of integration control, differential control and delay control and, further, the I-PD control is well known in the art as a control method in which differential control and delay control are selectively performed, in addition to feedback integration control, according to a correlation between output as a result of integration control and actual output.

Figure 13:
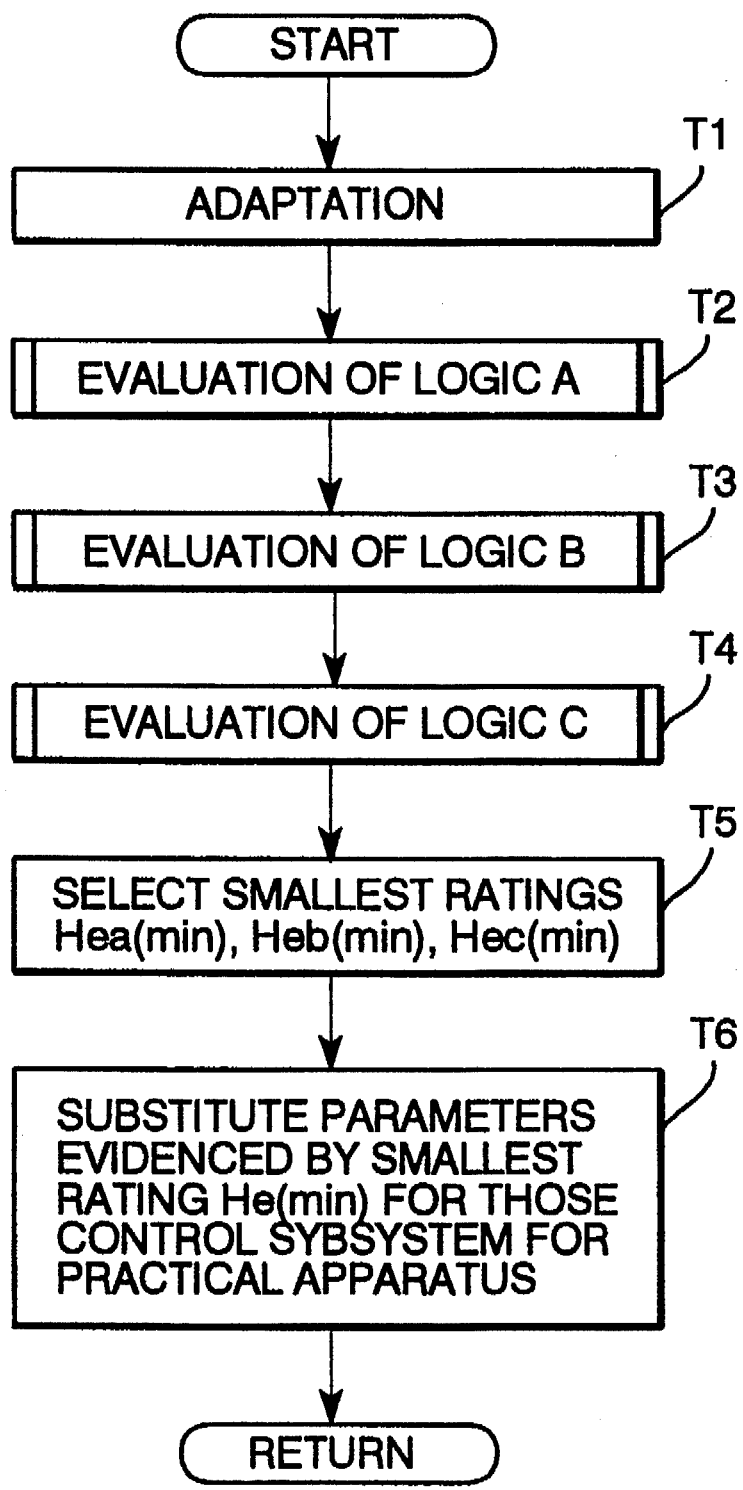
FIG. 13 is a flow chart illustrating a sequence routine of evaluation of control logic.

The optimization of control logic of the model control subsystem 20UB is illustrated by a flow chart shown in FIG. 13. The flow chart logic commences and control passes directly to step T1 where the adaptation of dynamic characteristics of the engine model 21B as was described previously in detail. Subsequently, the respective control logic A–C are evaluated and rated based on optimized control constants of the model control subsystem through steps T2–T4, respectively. One of the control logic A–C which is evidenced by the best rating among the three is selected at step T5. Finally, at step T6, the control logic and the control parameters evidenced by the best rating are substituted for those of the control system 20UA.

Figure 14:
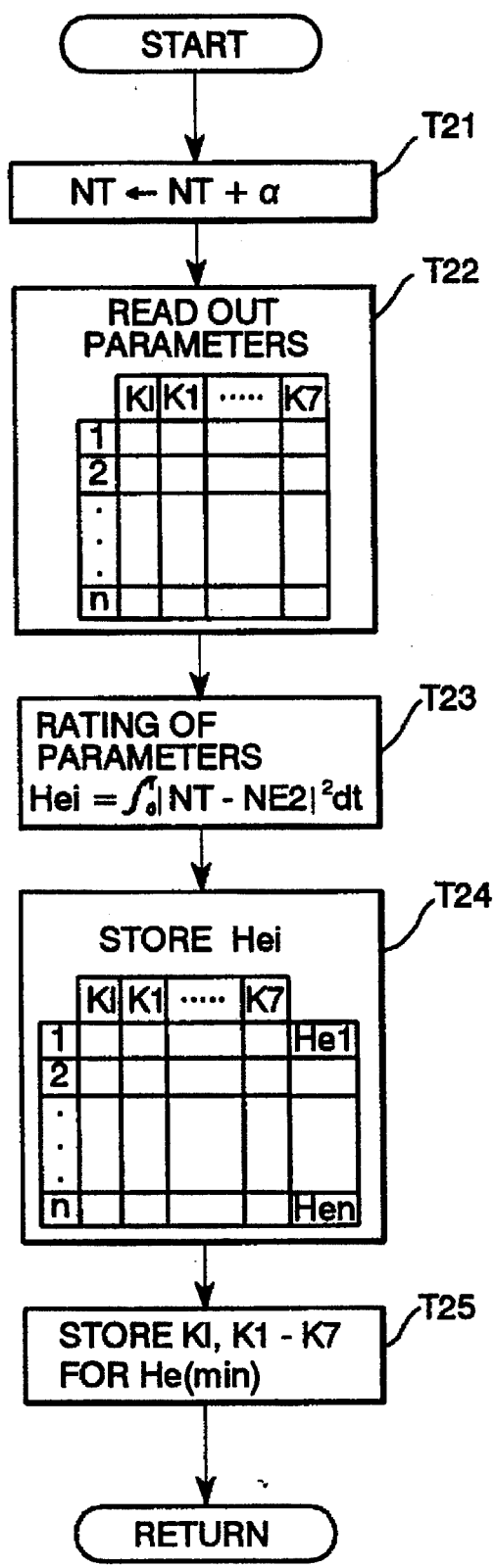
FIG. 14 is a flow chart illustrating a sequence routine of selection of the most suitable control logic.

Referring to FIG. 14 showing evaluation of the control logic A, after having varied the target idle speed NT by an increment of $\alpha$ in rpm at step T21, optimization is made for the control constants KI and K1–K7 of the model control subsystem 20UB through steps T22–T25 in the same manner as described in connection with FIG. 9. In this instance, the optimization is carried out simultaneously for the control constants KI and K1–K7 and the smallest rating Hea(min) and the control constants KI and K1–E7 for the smallest rating Hea(min) are stored. At step S23, the rating Hei is given as a result of integration of a squared value of the deviation en1 between a target idle speed (NT) input to and an idle speed (NS1) output from the model control subsystem 20UB.

At step T3, the evaluation is carried out for the control logic B in the same manner as for the control logic A, but with respect to proportional, integration and differential terms as control parameters different from control parameters KI and K1–K7. The smallest rating Heb(min) and the control parameters for the smallest rating Heb(min) are stored. Similarly, at step T4, the evaluation is carried out for the control logic C in the same manner as for the control logic A but with respect to control parameters different from control parameters KI and K1–K7. The smallest rating Hec(min) and the control parameters for the smallest rating Hec(min) are stored.

One of the control logic A–C which is evidenced by the smallest one He(min) of the three smallest ratings Hea(min), Heb(min) and Hec(min) obtained as a result of evaluations at steps T2, T3 and T4 and the control parameters for the control logic are selected and readout at step T5 and subsequently substituted for the control logic and parameters of the control subsystem 20UA at step T6. It is of course that, when a control logic is replaced with another control logic in the control subsystem 20UA, the other control logic is used in order to perform the adaptation of dynamic characteristics of the engine model.

Alternators, radiator fans and the like, which have large driving resistances, are also considered as external loads having strong influences on engine idle speed. In instances where apparatuses are related to vehicles which, in particular, need to generate driving torque, the extraordinary output may be an unusual change in action of the vehicle, for instance an unusual change in vehicle speed or an unusual change in acceleration, resulting from a torque change.

Although the present invention has been described in connection with the engine idle speed control system as an exemplary embodiment, it may be applied to various engine controls, such as air/fuel ratio control, supercharging pressure control, etc. Various applications to vehicle control may occur to those skilled in the art, which include traction control or antiskid brake system control for vehicles which controls slippage of driving wheels to follow a Larger value of slippage, suspension control for vehicles which controls a road clearance of a car body to keep a target clearance, control for 4-wheel drive vehicles which controls rear wheels to follow a target cornering angle, etc. Further, the present invention may be applied to controlling operations of various apparatuses other than automotive vehicles and control without using any target value.

It is also to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for controlling a dynamically operative apparatus, which has a dynamic characteristic by which a relationship exists between input to and output from said dynamically operative apparatus, in a specific control logic, said control system comprising:

an apparatus control subsystem for controlling operation of said dynamically operative apparatus;

an apparatus model having an imitate dynamic characteristic modeled on said input and output relationship; and a model control subsystem for controlling said apparatus model in said control logic while said apparatus control subsystem controls operation of said dynamically operative apparatus, performing adaptation of said imitate dynamic characteristic by optimizing control parameters of said apparatus model so that said apparatus model provides output in conformity with said input and output relationship, simulating operation of said dynamically operative apparatus by controlling said apparatus model after said adaptation of said imitate dynamic characteristic in said control logic, and regulating control parameters of said apparatus control subsystem according to a result of said simulation.

2. A control system as defined in claim 1, wherein said model control subsystem simulates operation of said dynamically operative apparatus by controlling said apparatus model with different control parameters of said model control subsystem and determines an optimum control parameter with which control parameters of said apparatus control subsystem is replaced.

3. A control system as defined in claim 1, wherein said model control subsystem simulates operation of said dynamically operative apparatus by controlling said apparatus model in different control logic and determines an optimum control logic with which a control logic of said apparatus control subsystem is replaced.

4. A control system as defined in claim 1, wherein said apparatus control subsystem controls operation of said dynamically operative apparatus so as to follow a target value of output.

5. A control system as defined in claim 1, wherein said model control subsystem performs adaptation of said imitate dynamic characteristic by optimizing a plurality of control parameters of said apparatus model, each said control parameter being different between an ordinary state of operation in which said dynamically operative apparatus provides stable output and a transitional state of operation in which said dynamically operative apparatus provides an extraordinary change in output.

6. A control system as defined in claim 5, wherein said model control subsystem performs adaptation of said imitate dynamic characteristic by optimizing said control parameters of said apparatus model for said transitional state of operation only after for said ordinary state of operation.

7. A control system as defined in claim 2, wherein said apparatus control subsystem controls operation of said dynamically operative apparatus so as to follow a target value of output.

8. A control system as defined in claim 7, wherein said apparatus is an automobile engine and said apparatus control subsystem controls an idle speed of said automobile engine so as to follow a target idle speed.

9. A control system as defined in claim 8, wherein said apparatus control subsystem controls idle speed control means for controlling an idle speed.

10. A control system as defined in claim 4, wherein said apparatus is an automobile engine and said apparatus control subsystem controls an idle speed of said automobile engine so as to follow a target idle speed.

11. A control system as defined in claim 10, wherein said apparatus control subsystem controls idle speed control means for controlling an idle speed.

12. A control system for controlling a dynamically operative apparatus, which has a dynamic characteristic by which a relationship exists between input to and output from said dynamically operative apparatus, in a specific control logic, said control system comprising:

an apparatus control subsystem for controlling operation of said dynamically operative apparatus;

an apparatus model having an imitate dynamic characteristic modeled on said input and output relationship of said dynamically operative apparatus; and a model control subsystem for controlling said apparatus model in said control logic when said dynamically operative apparatus produces an extraordinary change in output responding to specific input, performing adaptation of said imitate dynamic characteristic by optimizing control parameters of said apparatus model so that said apparatus model causes a change in output equivalent to said extraordinary change responding to said specific input, simulating operation of said dynamically operative apparatus by controlling said apparatus model after said adaptation of said imitate dynamic characteristic in said control logic so as to determine a corrective value necessary to eliminate said extraordinary change, and regulating control parameters of said apparatus control subsystem with said corrective value.

13. A control system as defined in claim 12, wherein said model control subsystem performs said adaptation with a physical value related directly to said extraordinary change.

14. A control system as defined in claim 13, wherein said dynamically operative apparatus is of an automotive vehicle and said physical value with which said model control subsystem performs said adaptation is a change in torque, said model control subsystem simulating operation of said automotive vehicle so as to eliminate an extraordinary change in action of said automotive vehicle other than said change in torque.

15. A control system as defined in claim 12, wherein said dynamically operative apparatus is of an automobile engine and said physical value with which said model control subsystem performs said adaptation is a change in idle speed of said automobile engine, said model control subsystem simulating operation of said dynamically operative apparatus so as to prevent said extraordinary change in said idle speed.

16. A control system as defined in claim 15, wherein said apparatus model further has an imitate dynamic characteristic modeled on an engine driven instrument having as an external load a strong influence on said idle speed and said model control subsystem performs said adaptation of said imitate dynamic characteristic of said engine driven instrument by optimizing control parameters of said apparatus model so that said apparatus model causes an extraordinary change due to driving friction of said engine driven instrument.

17. A control system as defined in claim 16, wherein said apparatus model further has an imitate dynamic characteristic modeled on an input and output relationship of said engine and, while said engine driven instrument is stopped, said model control subsystem performs said adaptation of said imitate dynamic characteristic modeled on said input and output relationship of said engine so as to provide output in conformity with said input and output relationship.

* * * * *